United States Patent
Lee et al.

(10) Patent No.: US 10,154,395 B2
(45) Date of Patent: Dec. 11, 2018

(54) TERMINAL AND SERVICE PROVIDING DEVICE, ELECTRONIC WALLET SYSTEM COMPRISING THE SAME, CONTROL METHOD THEREOF, AND NON-TRANSITORY COMPUTER READABLE STORAGE MEDIUM HAVING COMPUTER PROGRAM RECORDED THEREON

(71) Applicant: SK Planet Co., Ltd., Seongnam-si, Gyeonggi-do (KR)

(72) Inventors: Han Ho Lee, Seoul (KR); Jong Soo Lee, Seoul (KR)

(73) Assignee: SK PLANET CO., LTD., Seongnam-si (KR)

( * ) Notice: Subject to any disclaimer, the term of this patent is extended or adjusted under 35 U.S.C. 154(b) by 0 days.

(21) Appl. No.: 14/897,188

(22) PCT Filed: Nov. 13, 2014

(86) PCT No.: PCT/KR2014/010908
§ 371 (c)(1),
(2) Date: Dec. 9, 2015

(87) PCT Pub. No.: WO2015/122599
PCT Pub. Date: Aug. 20, 2015

(65) Prior Publication Data
US 2016/0142857 A1    May 19, 2016

(30) Foreign Application Priority Data
Feb. 11, 2014 (KR) ........................ 10-2014-0015375

(51) Int. Cl.
*G06Q 50/00*  (2012.01)
*H04W 8/24*   (2009.01)
(Continued)

(52) U.S. Cl.
CPC .............. *H04W 4/60* (2018.02); *G06Q 50/01* (2013.01); *H04W 8/24* (2013.01); *H04W 4/80* (2018.02)

(58) Field of Classification Search
CPC .............. G06Q 30/02; G06Q 20/4014; G06Q 30/0207; G06Q 30/0269; G06Q 30/0613;
(Continued)

(56) References Cited

U.S. PATENT DOCUMENTS

2006/0282856 A1* 12/2006 Errico ............... G06F 17/30035
725/46
2008/0262928 A1* 10/2008 Michaelis .............. G06Q 30/02
705/14.26

(Continued)

FOREIGN PATENT DOCUMENTS

KR      100366150 B1    12/2002
KR      101324429 B1    10/2013
(Continued)

OTHER PUBLICATIONS

International Search Report for PCT/KR2014/010908 dated Feb. 17, 2015.

*Primary Examiner* — George Eng
*Assistant Examiner* — Umair Ahsan
(74) *Attorney, Agent, or Firm* — Brinks Gilson & Lione (57) ABSTRACT

Provided are a terminal and a service providing device, an electronic wallet system including the same, a control method thereof, and a non-transitory computer readable storage medium having a computer program recorded thereon. That is, according to the present invention, instead of directly sharing a content including personal information displayed in a specific app, such as an electronic wallet app, installed in the terminal with an SNS or the like, the same content, which does not include personal information and is previously stored in the service providing device so as to correspond to the content, is shared through an SNS corresponding to the terminal, so that it is possible to improve convenience of a user and enhance availability of contents.

6 Claims, 6 Drawing Sheets

(51) Int. Cl.
*H04W 4/60* (2018.01)
*H04W 4/80* (2018.01)

(58) Field of Classification Search
CPC .............. G06Q 30/0641; G06Q 50/01; H04L 63/0876; H04L 63/10; H04L 67/06; H04L 67/2814; H04L 67/306; H04W 4/025; G06F 17/2288
See application file for complete search history.

(56) References Cited

U.S. PATENT DOCUMENTS

| | | | |
|---|---|---|---|
| 2012/0191569 A1* | 7/2012 | Shah | G06Q 30/0613 705/26.41 |
| 2013/0006738 A1* | 1/2013 | Horvitz | G06Q 50/01 705/14.16 |
| 2013/0036363 A1* | 2/2013 | Johnson | G06F 21/6245 715/738 |

FOREIGN PATENT DOCUMENTS

| | | |
|---|---|---|
| KR | 101350712 B1 | 1/2014 |
| WO | 2013060210 A1 | 5/2013 |

\* cited by examiner

TERMINAL AND SERVICE PROVIDING DEVICE, ELECTRONIC WALLET SYSTEM COMPRISING THE SAME, CONTROL METHOD THEREOF, AND NON-TRANSITORY COMPUTER READABLE STORAGE MEDIUM HAVING COMPUTER PROGRAM RECORDED THEREON

CROSS REFERENCE TO RELATED APPLICATION

This application claims the benefit of Korean Application No. 10-2014-0015375 filed on Feb. 11, 2014 with the Korean Intellectual Property Office. Further, this application is the National Phase application of International Application No. PCT/KR2014/010908 filed on Nov. 13, 2014, the disclosure of which is incorporated herein by reference in its entirety.

BACKGROUND OF THE INVENTION

1. Field of the Invention

The present invention relates to a terminal and a service providing device, an electronic wallet system including the same, a control method thereof, and a non-transitory computer readable storage medium having a computer program recorded thereon, and more particularly, to a terminal and a service providing device, an electronic wallet system including the same, a control method thereof, and a non-transitory computer readable storage medium having a computer program recorded thereon capable of providing a sharing/interworking function of sharing a content including personal information displayed in a specific app, such as an electronic wallet app, installed in the terminal with an SNS corresponding to the terminal by interworking with the service providing device.

2. Description of the Related Art

An electronic wallet system is a system of managing credit cards, transportation cards, membership cards, coupons, and the like through a user terminal with a USIM card and the like and providing a payment function between the user terminal and an affiliated terminal.

A specific app such as an electronic wallet app installed in a user terminal of such an electronic wallet system manages and displays a content including personal information of the user terminal. Therefore, the content is not shared or interworked with an SNS or the like, and, thus, there is an inconvenience in using the content.

Further, if content including personal information is disclosed through the SNS or the like, there is a risk of personal information leakage.

SUMMARY OF THE INVENTION

An object of the present invention is to provide a terminal and a service providing device, an electronic wallet system including the same, a control method thereof, and a non-transitory computer readable storage medium having a computer program recorded thereon capable of, instead of directly sharing a content including personal information displayed in a specific app, such as an electronic wallet app, installed in the terminal with an SNS or the like, sharing the same content, which does not include personal information and is previously stored in the service providing device so as to correspond to the content, through an SNS corresponding to the terminal.

Another object of the present invention is to provide a terminal and a service providing device, an electronic wallet system including the same, a control method thereof, and a non-transitory computer readable storage medium having a computer program recorded thereon capable of separately managing a specific content and a content including personal information in addition to the specific content, and providing the specific content and the content including personal information for each use.

According to an aspect of the present invention, a first terminal includes: a communication unit configured to communicate with the outside when a pre-installed specific app is executed; a display unit configured to display a specific app execution result screen including a content including at least one of payment-related card information, coupon-related information, gift card-related information, and identification data for identifying the content; and a control unit configured to control the communication unit so as to transmit, to a service providing device, identification data for identifying a content corresponding to a predetermined share button included in the specific app execution result screen when the share button is selected, control the communication unit so as to receive access address information for accessing a content corresponding to the identification data acquired from the service providing device on the basis of the identification data, and control the received access address information so as to be linked to an SNS account interworking with the specific app.

In an embodiment of the present invention, the content includes identification information on the first terminal.

According to another aspect of the present invention, a service providing device includes: a storage unit configured to store a plurality of contents and identification data for identifying each of the plurality of contents; a communication unit configured to receive identification data for identifying a content corresponding to a predetermined share button and transmitted from a first terminal when the share button is selected in the first terminal; and a control unit configured to verify a content corresponding to the received identification data among the plurality of stored contents and control the communication unit so as to transmit access address information at which the verified content is stored to the first terminal.

In an embodiment of the present invention, the content corresponding to the identification data and stored in the first terminal includes a content corresponding to the identification data and identification information on the first terminal.

In an embodiment of the present invention, the control unit controls the communication unit so as to transmit a content corresponding to the access address information to a second terminal configured to select the access address information linked to an SNS account interworking with the first terminal and thus access the service providing device.

In an embodiment of the present invention, the control unit checks whether or not a specific app provided by the service providing device is installed on the basis of identification information on the second terminal accessing the service providing device, and controls the communication unit so as to transmit a content corresponding to the access address information to the second terminal when the specific app is installed in the second terminal as a result of checking.

In an embodiment of the present invention, the control unit installs the specific app in the second terminal by interworking with the second terminal when the specific app is not installed in the second terminal as a result of checking, and controls the communication unit so as to transmit the content corresponding to the access address information to the second terminal.

In an embodiment of the present invention, the control unit determines a kind of the second terminal accessing the service providing unit, and controls the communication unit so as to transmit a content corresponding to the access address information to the second terminal when the second terminal is a fixed terminal as a result of determination.

In an embodiment of the present invention, when the second terminal is a mobile terminal as a result of determination, the controls unit controls the communication unit so as to transmit content corresponding to the access address information to the second terminal depending on whether or not the specific app is installed.

According to yet another aspect of the present invention, a control method of a first terminal includes: controlling, by means of a control unit, a display unit so as to display a specific app execution result screen including a content including at least one of payment-related card information, coupon-related information, gift card-related information, and identification data for identifying the content when a pre-installed specific app is executed; transmitting, by means of a communication unit, identification data for identifying the content corresponding to a predetermined share button included in the specific app execution result screen when the share button is selected; receiving, by means of the communication unit, access address information for accessing a content corresponding to the identification data acquired from the service providing device on the basis of the identification data; and linking, by means of the control unit, the received access address information to an SNS account interworking with the specific app.

According to still another aspect of the present invention, a control method of a service providing device includes: receiving, by means of a communication unit, identification data for identifying a content to a predetermined share button and transmitted from a first terminal when the share button is selected in the first terminal; verifying, by means of a control unit, a content corresponding to identification data for identifying the received content among a plurality of previously stored contents; and transmitting, by means of a communication unit, access address information at which the verified content is stored to the first terminal.

According to still another aspect of the present invention, a computer program for executing the control method according to the aforementioned embodiment may be stored in a non-transitory computer readable storage medium having a computer program recorded thereon.

According to still another aspect of the present invention, an electronic wallet system includes: a first terminal configured to transmit, to a service providing device, identification data for identifying a content corresponding to a predetermined share button included in a specific app execution result screen including a content including at least one of payment-related card information, coupon-related information, gift card-related information, and identification data for identifying the content when the share button is selected, receive access address information for accessing a content corresponding to the identification data acquired from the service providing device on the basis of the access address information for accessing the content corresponding to the identification data acquired from the service providing device on the basis of the transmitted identification data, and link the received access address information to an SNS account interworking with the specific app; a second terminal configured to access the service providing device corresponding to the access address information when the access address information linked to the SNS account is selected; and the service providing device configured to verify access address information for accessing a content corresponding to the identification data for identifying the content transmitted from the first terminal among a plurality of previously stored contents, transmit, to the first terminal, the verified access address information for accessing the content corresponding to the identification data, and transmit a content corresponding to the access address information to the second terminal accessing the service providing device through access address information linked to an SNS account interworking with the first terminal.

As described above, according to the present invention, instead of directly sharing a content including personal information displayed in a specific app, such as an electronic wallet app, installed in the terminal with an SNS or the like, the same content, which does not include personal information and is previously stored in the service providing device so as to correspond to the content, is shared through an SNS corresponding to the terminal, so that it is possible to improve convenience of a user and enhance availability of contents.

Further, according to the present invention, a specific content and a content including personal information in addition to the specific content are separately managed and the specific content and the content including personal information are provided for each use, so that it is possible to protect personal information and improve content management efficiency.

DETAILED DESCRIPTION OF THE PREFERRED EMBODIMENTS

It is noted that technical terms used in the present invention are used to just describe a specific embodiment and do not intend to limit the present invention. Further, if the technical terms used in the present invention are not particularly defined as other meanings in the present invention, the technical terms should be appreciated as meanings generally appreciated by those skilled in the art and should not be appreciated as excessively comprehensive meanings or excessively reduced meanings. Further, when the technical term used in the present invention is a wrong technical term that does not accurately express the spirit of the present invention, the technical term should be understood by being substituted by a technical term which can be correctly understood by those skilled in the art. In addition, a general term used in the present invention should be interpreted as defined in a dictionary or contextually, and should not be interpreted as an excessively reduced meaning.

In addition, singular expressions used in the present invention include plurals expressions unless they have definitely opposite meanings. In the present invention, it should not analyzed that a term such as "comprising" or "including" particularly includes various components or various steps disclosed in the specification and some component or some steps among them may not be included or additional components or steps may be further included. In addition, terms including ordinal numbers, such as 'first' and 'second', used in the present invention can be used to describe various components, but the components should not be limited by the terms. The above terms are used only to discriminate one component from the other components. For example, a first component may be named a second component and similarly, the second component may also be named the first component, without departing from the scope of the present invention.

Hereinafter, preferable exemplary embodiment of the present invention will be described in more detail with reference to the accompanying drawings. Like reference numerals refer to like elements for easy overall understanding and a duplicated description of like elements will be omitted.

Further, in the following description, a detailed explanation of known related technologies may be omitted to avoid unnecessarily obscuring the subject matter of the present invention. Further, it is noted that the accompanying drawings are only for easily understanding the spirit of the present invention and it should not be interpreted that the spirit of the present invention is limited by the accompanying drawings.

Figure 1:
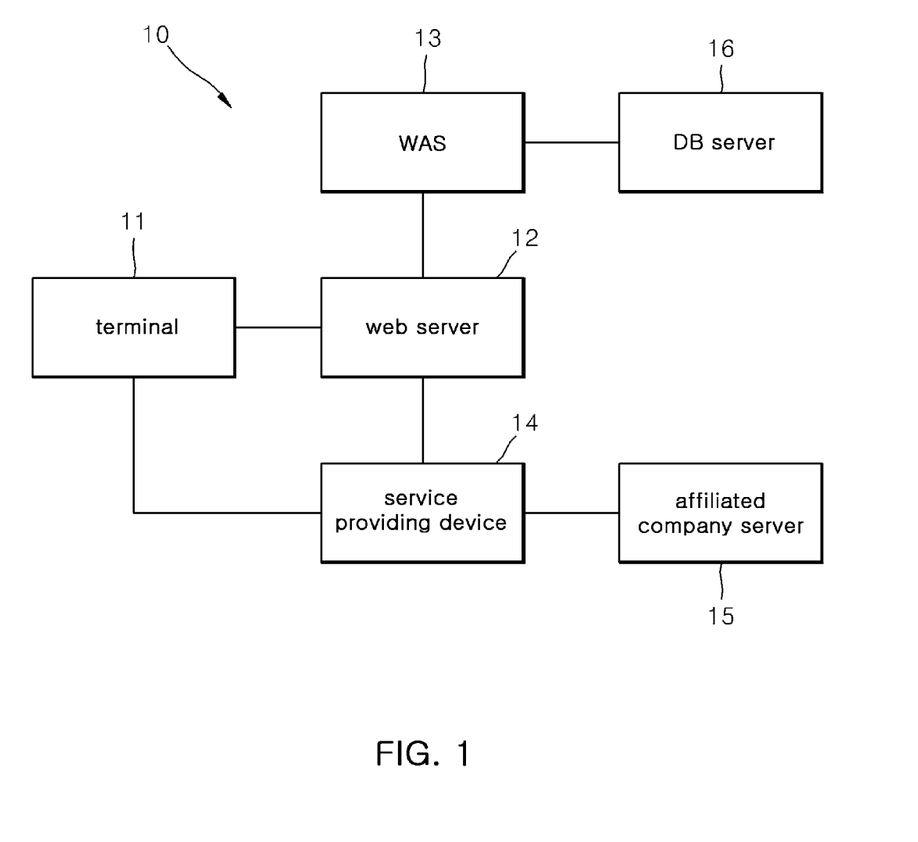
FIG. 1 is a block diagram illustrating a configuration of an electronic wallet system according to an embodiment of the present invention.

FIG. 1 is a block diagram illustrating a configuration of an electronic wallet system 10 according to an embodiment of the present invention.

As illustrated in FIG. 1, the electronic wallet system 10 is constituted by a terminal 11, a web server 12, a web application server (WAS) 13, a service providing device 14, an affiliated company server 15, and a database (DB) server 16.

All the constituent elements of the electronic wallet system 10 illustrated in FIG. 1 are not essential constituent elements, and the electronic wallet system 10 may be implemented by more constituent elements than the constituent elements illustrated in FIG. 1 or less constituent elements therethan.

The terminal described herein may include a fixed terminal and a mobile terminal. The fixed terminal may include a digital TV, a desktop computer, and the like. The mobile terminal may include a smart phone, a laptop computer, a digital broadcasting terminal, a personal digital assistant (PDA), a portable multimedia player (PMP), a navigation system, and the like.

The terminal 11 (alternatively, a user equipment) is identified by unique identification information such as a mobile directory number (MDN), a mobile IP, a mobile MAC, a Sim card unique information, and serial number and communicates with the web server 12 through a wired/wireless communication network. In this case, the terminal 11 receives and stores payment-related card information, coupon-related information, gift card-related information, and the like from the web server 12 and displays corresponding information when executing a specific app or selecting a specific menu. In this case, the payment-related card information may include an image or a video for the card, an affiliated company name, a card name, a card number, an expiration date, a benefit, an annual fee, barcode information/QR code information/NFC tag information/smart tag information associated with the corresponding card, and the like. Further, the coupon related information may include an affiliated company name, a coupon name, a coupon number, a benefit, a used place, a used period, a using method, and the like, and the gift card-related information may include an affiliated company name, a gift card name, a gift card number, a price, a used place, a used period, a using method, and the like.

Further, the terminal 11 receives information related with a specific payment-related card, a coupon, a ticket, a gift card, and the like selected by the user from the service providing device 14 through the web server 12.

The web server 12 verifies information stored in the DB server 16 and related with the corresponding terminal 11 through the WAS 13 based on identification information transmitted from the terminal 11 and provides the verified information to the terminal 11.

Further, when a request for issuing the payment-related card, the coupon, the ticket, the gift card, and the like is transmitted from the terminal 11, the web server 12 transfers the corresponding request to the service providing device 14, so that the service providing device 14 receives related information from the affiliated company server and provides (or issues) the payment-related card, the coupon, the ticket, the gift card, and the like to the terminal 11.

As such, the web server 12 acquires and provides information stored in the DB server 16 through the WAS 13 in response to the request of the terminal 11 or provides the information transferred from the affiliated company server 15 to the terminal 11 through the service providing device 14.

The WAS 13 (alternatively, the web application server) provides the information stored in the DB server 16 to the terminal 11 through the web server 12 based on the identification information on the terminal 11 transmitted from the web server 12 and further, performs distributed processing of a function of the web server 12.

The service providing device 14 provides information in response to the request of the terminal 11 to the terminal 11 based on the identification information on the terminal 11 transmitted from the web server 12 or receives the corresponding information transmitted from the affiliated company server 15 and then provides the received information to the terminal 11 if necessary.

As an example, when the request for issuing the payment-related card, the coupon, the ticket, the gift card, and the like is received through the web server 12 from the terminal 11, the service providing device 14 receives the related information transmitted from the affiliated company server 15 in response to the corresponding request to transmit the received related information to the terminal 11.

That is, when the web server 12 receives the issuance request for a specific payment-related card from the terminal 11, the web server 12 transmits the corresponding issuance request to the service providing device 14 together with the identification information on the terminal. Thereafter, the service providing device 14 issues (alternatively, transmits) the corresponding payment-related card to the terminal 11 corresponding to the identification information in response to the transmitted issuance request information for the corresponding payment-related card. In this case, the service providing device 14 receives the payment-related card from the affiliated company server 15 to provide (alternatively, transmit) the received payment-related card to the terminal 11.

The affiliated company server 15 (alternatively, an affiliated company service device) is connected with the service providing device 14 with a wired/wireless communication network, and when the issuance request of the card related with the affiliated company server 15 is transferred from the service providing device 14, a payment-related card is issued to the terminal 11 through the service providing device 14 in response to the corresponding request.

The DB sever 16 is connected with the WAS 13 through the wired/wireless communication network and stores information corresponding to the identification information on the terminal 11 (including, for example, payment-related card issuance information, payment-related card usage information, issuance information on barcode/QR code/NFC tag/smart tag, usage information on barcode/QR code/NFC tag/smart tag, point reservation/usage information, coupon issuance/usage information, and the like).

Further, the DB server 16 transmits the information on the terminal 11 corresponding to the identification information to the web server 12 through the WAS 13 in response to the request of the web server 12 including the identification information on the specific terminal 11.

Further, the electronic wallet system 10 may further include a coupon server (not illustrated) which communicates with the service providing device 14 and the affiliated company server 15.

When a coupon issuance request is received from the terminal 11, the web server 12 receives the corresponding request transmitted from the terminal 11 to transmit the received request to the service providing device 14. In addition, the service providing device 14 receives a coupon corresponding to the received request from the coupon server (alternatively, a coupon service device) to directly issue the received coupon to the terminal 11 or issue the received coupon to the terminal 11 through the web server 12. In this case, the coupon server receives (alternatively, issues) the corresponding coupon from the affiliated company server 15.

Further, the coupon server generates the coupon corresponding to the coupon issuance request (alternatively, receives the coupon provided from the affiliated company server 15) in response to the coupon issuance request of the web server 12 and may issue the coupon to the terminal 11 corresponding to the identification information included in the coupon issuance request.

Figure 2:
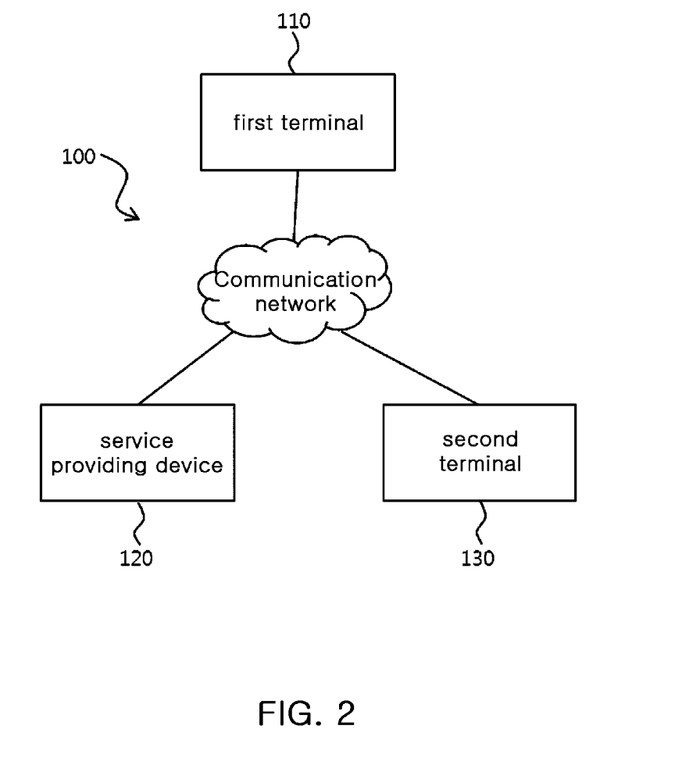
FIG. 2 is a block diagram illustrating a configuration of an electronic wallet system according to an embodiment of the present invention.

FIG. 2 is a block diagram illustrating a configuration of an electronic wallet system 100 according to an embodiment of the present invention.

As illustrated in FIG. 2, the electronic wallet system 100 is constituted by a first terminal 110, a service providing device 120, and a second terminal 130. All of the constituent elements of the electronic wallet system 100 illustrated in FIG. 2 are not essential constituent elements, and the electronic wallet system 100 may be implemented by more constituent elements than the constituent elements illustrated in FIG. 2 or less constituent elements therethan.

If a share function for a content interworking with a specific app, such as an electronic wallet app, installed in the first terminal 110 and displayed in the specific app is selected, the first terminal 110 transmits identification data for identifying the selected content to the service providing device 120 through the communication network. Then, the service providing device 120 checks access address information for accessing a content corresponding to the identification data among a plurality of contents and transmits the checked access address information for accessing a content to the first terminal 110 through the communication network. Then, the first terminal 110 accesses an SNS server (not illustrated) through an SNS-related menu or the like interworking with the specific app and links the received access address information to a corresponding SNS account. Then, if the access address information linked to the SNS account is selected by the second terminal 130, the second terminal 130 accesses the service providing device 120 corresponding to the access address information through the communication network. Then, the second terminal 130 receives a content corresponding to the access address information transmitted from the service providing device 120 and displays the received content.

Figure 3:
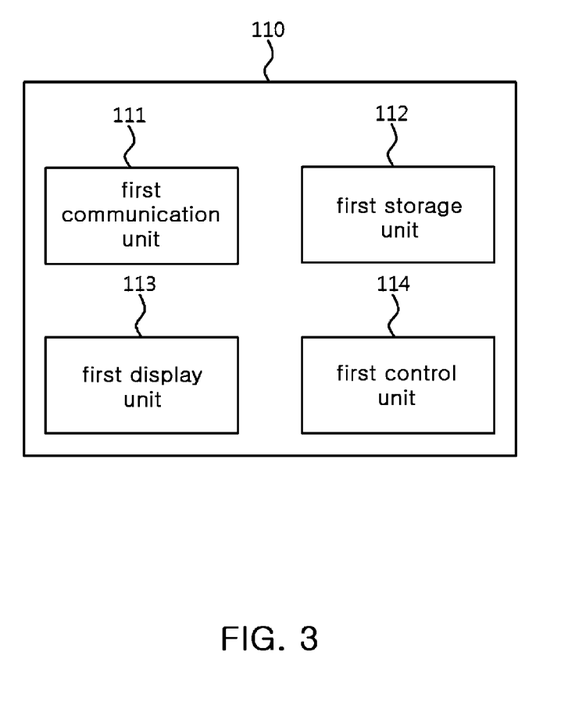
FIG. 3 is a block diagram illustrating a configuration of a first terminal according to an embodiment of the present invention.

As illustrated in FIG. 3, the first terminal 110 is constituted by a first communication unit 111, a first storage unit 112, a first display unit 113, and a first control unit 114. All of the constituent elements of the first terminal 110 illustrated in FIG. 3 are not essential constituent elements, and the first terminal 110 may be implemented by more constituent elements than the constituent elements illustrated in FIG. 3 or less constituent elements therethan.

The first communication unit 111 communicates with an internal constituent element or at least one external terminal via the wired/wireless communication network. In this case, the external terminal may include the service providing device 120, the second terminal 130, the SNS server, and the like.

Further, the first communication unit 111 receives a content including payment-related card information, coupon-related information, gift card-related information, and identification data (or identification information) for identifying the content transmitted from the service providing device 120 by the control of the first control unit 114.

The first storage unit 112 stores a user interface (UI), a graphic user interface (GUI), and the like therein.

Further, the first storage unit 112 stores data and programs required to operate the first terminal 110.

Further, the first storage unit 112 stores the content including payment-related card information, coupon-related information, gift card-related information, and identification data for identifying the content transmitted from the service providing device 120 by the control of the first control unit 114.

The first display unit 113 may display contents such as menu screens by using the UI and/or GUI stored in the first storage unit 112 by the control of the first control unit 114. Herein, the contents displayed on the first display unit 113 may include menu screens including texts or image data (including various information data) and data such as icons, a list menu, a combo box, and the like. Further, the first display unit 113 may be a touch screen.

Further, the first display unit 113 displays the content including payment-related card information, coupon-related information, gift card-related information, and identification data (or identification information) for identifying the content through a pre-installed specific app such as an electronic wallet app by the control of the first control unit 114.

The first control unit 114 executes an overall control function of the first terminal 110.

Further, when a specific app such as an electronic wallet or digital wallet app pre-installed in the first storage unit 112 is executed, the first control unit 114 displays a specific app execution result screen corresponding to the specific app on the first display unit 113. Here, the specific app execution result screen includes a my-wallet menu, an add menu, an event/news menu, a more-view menu, and the like. In this case, the more-view menu includes an activity-point menu, a housekeeping book menu, a point integrated query menu, a social network service (SNS)-related menu, and the like. In this case, the my-wallet menu is a menu storing information on the payment-related card, the coupon, the ticket, the gift card, and the like, which is installed or registered in the first terminal 140 through the specific app. Further, the add menu is a menu for newly getting the payment-related card, the coupon, the ticket, other classification items through the specific app. Further, the event/news menu is a menu for verifying information on events or notices and the like transmitted from the service providing device and the like. Further, the activity-point menu is a menu for providing activity points interworking with a plurality of predetermined apps and a plurality of apps or related companies which may use related activity points. Further, the housekeeping book menu is a menu (alternatively, a housekeeping book-dedicated app) for providing information on details of usage of the card registered in a membership item of the my-wallet menu, details of point usage, and the like in a housekeeping book form. Further, the point integrated query menu is a menu representing point information on the card registered in the membership item of the my-wallet menu. Further, the SNS-related menu is a facebook site-related menu interworking with the specific app.

Further, when the specific app is executed, the first control unit 114 identifies the first terminal 110 through unique identification information such as the MDN, the mobile IP, the mobile MAC, the Sim card unique information, and a serial number of the first terminal 110 and communicates with the service providing device 120 via the wired/wireless communication network. In this case, the first control unit 114 transmits the identification information on the first terminal 110 to the service providing device 120 in a background state, and the service providing device 120 identifies the first terminal 110 based on the identification information and communicates with the first terminal 110.

Further, the execution result screen displayed on the first display unit 113 includes the content including the payment-related card information, the coupon-related information, the gift card-related information, the identification data for identifying the content, and the like corresponding to the specific app, and the content may include unique identification information on the first terminal 110. In this case, the payment-related card information may include an image or a video for the card, an affiliated company name, a card name, a card number, an expiration date, a benefit, an annual fee, barcode information/QR code information/NFC tag information/smart tag information associated with the corresponding card, and the like. Further, the coupon-related information may include an affiliated company name, a coupon name, a coupon number, a benefit, a used place, a used period, a using method, and the like. Further, the gift card-related information may include an affiliated company name, a gift card name, a gift card number, a price, a used place, a used period, a using method, and the like. Further, the identification information on the first terminal 110 includes an MDN, a mobile IP, a mobile MAC, a Sim card unique information, and serial number.

Further, if a predetermined share button displayed on a partial region of a content displayed on the first display unit 113 or a predetermined share button included in the first terminal 110 is selected, the first control unit 114 transmits identification data (or identification information/identification number) for identifying a content corresponding to the selected share button to the service providing device 120 through the first communication unit 111.

Further, in response to the transmitted identification data, the first control unit 114 receives access address information (including, for example, a uniform resource locator (URL)) for accessing the identification data transmitted from the service providing device 120 (alternately, access address information of the service providing device 120 that stores a content corresponding to the identification data) through the first communication unit 111. Herein, the content corresponding to the access address information (or address information) transmitted from the service providing device 120 and stored in the service providing device 120 includes the same content as the content displayed on the first display unit 113. Although the content displayed on the first display unit 113 includes identification information on the first terminal 110, the content corresponding to the access address information transmitted from the service providing device 120 and stored in the service providing device 120 does not include identification information on a terminal (for example, identification information on the first terminal 110). That is, the content displayed on the first display unit 113 may include the identification information on the first terminal 110 in addition to the same content previously stored in the service providing device 120.

Further, the first control unit 114 displays the received access address information on the first display unit 113 or stores the received access address information in the first storage unit 112.

Further, the first control unit 114 accesses a predetermined SNS server corresponding to the first terminal 110 through the first communication unit 111, or accesses an SNS server through the SNS-related menu interworking with the specific app.

Further, the first control unit 114 links (or uploads) the received access address information to a corresponding SNS account (or an SNS account corresponding to the user of the first terminal 110).

Figure 4:
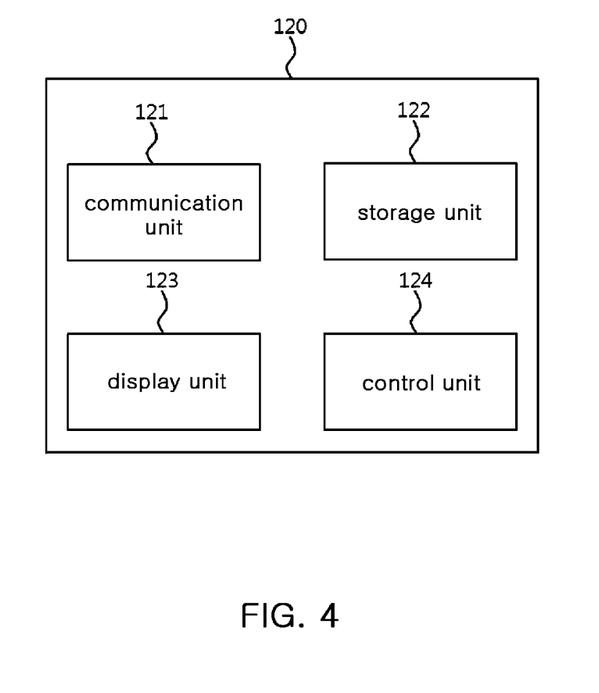
FIG. 4 is a block diagram illustrating a configuration of a service providing device according to an embodiment of the present invention.

As illustrated in FIG. 4, the service providing device 120 is constituted by a communication unit 121, a storage unit 122, a display unit 123, and a control unit 124. All of the constituent elements of the service providing device 120 illustrated in FIG. 4 are not essential constituent elements, and the service providing device 120 may be implemented by more constituent elements than the constituent elements illustrated in FIG. 4 or less constituent elements therethan.

The communication unit 121 communicates with an internal constituent element or at least one external terminal via the wired/wireless communication network. In this case, the external terminal may include the first terminal 110, the second terminal 130, and the like.

Further, the communication unit 121 transmits a content including payment-related card information, coupon-related information, gift card-related information, and identification data for identifying the content to the first terminal 110 or the second terminal 130 by the control of the control unit 124.

Further, the communication unit 121 receives identification data (or identification information/identification number) for identifying a content transmitted from the first terminal 110 by the control of the control unit 124.

The storage unit 122 stores a user interface (UI), a graphic user interface (GUI), and the like therein.

Further, the storage unit 122 stores data and programs required to operate the service providing device 120.

Further, the storage unit 122 stores a plurality of contents and identification data respectively corresponding to the contents.

Further, the storage unit 122 stores identification information of a terminal in which a specific app, such as an electronic wallet app, provided by the service providing device 120 is installed (or downloaded) by the control of the control unit 124.

Further, the storage unit 122 stores identification data transmitted from the first terminal 110 by the control of the control unit 124.

The display unit 123 may display contents such as menu screens by using the UI and/or GUI stored in the storage unit 122 by the control of the control unit 124. Herein, the contents displayed on the display unit 123 may include menu screens including texts or image data (including various information data) and data such as icons, a list menu, a combo box, and the like. Further, the display unit 123 may be a touch screen.

The control unit 124 executes an overall control function for the service providing device 120.

Further, the control unit 124 transmits the content including the payment-related card information, the coupon-related information, the gift card-related information, and the identification data for identifying the content to the first terminal 110 or the second terminal 130 through the communication unit 121.

Further, the control unit 124 issues a payment-related card or coupon to the first terminal 110 or the second terminal 130 by interworking with the coupon server (not illustrated) or the affiliated company server (not illustrated).

Further, the control unit 124 verifies a content corresponding to identification data received by the communication unit 121 (or access address information storing the content corresponding to identification data) among the plurality of contents (each including unique identification data) previously stored in the storage unit 122. Herein, the content verified by the control unit 124 includes the same content as the content displayed on the first terminal 110. Although the content displayed on the first terminal 110 includes identification information on the first terminal 110, the content verified by the control unit 124 (or the plurality of contents previously stored in the service providing device 120) does not include identification information on a terminal (for example, identification information on the first terminal 110 and the like). That is, the content displayed on the first terminal 110 may include the identification information on the first terminal 110 in addition to the same content previously stored the storage unit 122 of the service providing device 120.

Further, the control unit 124 verifies access address information at which the verified content is stored in the storage unit 122 (or access address information of the service providing device 120 in which the verified content is stored).

Further, the control unit 124 transmits access address information for accessing the verified content in response to the received identification data (or access address information at which the content is stored) to the first terminal 110 through the communication unit 121.

Further, with respect to the second terminal 130 that accesses the service providing device 120 by clicking access address information provided by the SNS server, the control unit 124 verifies a content corresponding to the access address information and transmits the verified content to the second terminal 130 through the communication unit 121.

In this case, when the control unit 124 transmits the content corresponding to the access address information to the second terminal 130 accessed with the access address information, the control unit 124 may provide the content to the second terminal 130 by any one of the following three methods.

Firstly, the control unit 124 transmits the content corresponding to the access address information to the second terminal 130 regardless of whether or not the specific app provided by the service providing device 120 is installed in the second terminal 130. Then, the second terminal 130 displays the content through a web browser or the like installed in the second terminal 130.

Secondly, the control unit 124 checks whether or not the specific app provided by the service providing device 120 is installed on the basis of the identification information on the second terminal 130 accessing the service providing device 120. Further, if the specific app is installed in the second terminal 130 as a result of checking, the control unit 124 transmits the content corresponding to the access address information to the second terminal 130 through the communication unit 121 and the second terminal 130 displays the content through the specific app. Further, if the specific app is not installed in the second terminal 130 as a result of checking, the control unit 124 induces (or requests) the second terminal 130 to install the specific app and then, after the specific app is installed in the second terminal 130, the control unit 124 transmits the content corresponding to the access address information to the second terminal 130 through the communication unit 121 and the second terminal 130 displays the content through the specific app.

Thirdly, the control unit 124 may determine a kind of the second terminal 130 accessing the service providing device 120. That is, the control unit 124 determines whether the second terminal 130 is a fixed terminal or a mobile terminal. Further, if the second terminal 130 is a fixed terminal as a result of determination, the control unit 124 transmits the content corresponding to the access address information to the second terminal 130 through the communication unit 121 regardless of whether or not the specific app is installed and the second terminal 130 displays the content through the web browser or the like installed in the second terminal 130. Further, if the second terminal 130 is a mobile terminal as a result of determination, the control unit 124 checks whether or not the specific app provided by the service providing device 120 is installed on the basis of the identification information on the second terminal 130 accessing the service providing device 120. Further, if the specific app is installed in the second terminal 130 as a result of checking, the control unit 124 transmits the content corresponding to the access address information to the second terminal 130 through the communication unit 121 and the second terminal 130 displays the content through the specific app. Further, if the specific app is not installed in the second terminal 130 as a result of checking, the control unit 124 induces (or requests) the second terminal 130 to install the specific app and then, after the specific app is installed in the second terminal 130, the control unit 124 transmits the content corresponding to the access address information to the second terminal 130 through the communication unit 121 and the second terminal 130 displays the content through the specific app.

As described above, the service providing device 120 may provide the content by various methods depending on whether or not the specific app provided by the service providing device 120 is installed in the second terminal 130, a kind of the second terminal 130, and the like.

Figure 5:
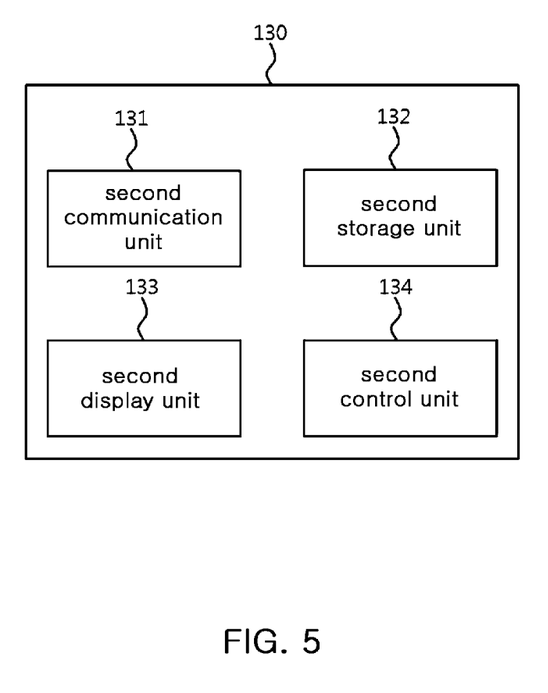
FIG. 5 is a block diagram illustrating a configuration of a second terminal according to an embodiment of the present invention.

As illustrated in FIG. 5, the second terminal 130 is constituted by a second communication unit 131, a second storage unit 132, a second display unit 133, and a second control unit 134. All of the constituent elements of the second terminal 130 illustrated in FIG. 5 are not essential constituent elements, and the second terminal 130 may be implemented by more constituent elements than the constituent elements illustrated in FIG. 5 or less constituent elements therethan.

The second communication unit 131 communicates with an internal constituent element or at least one external terminal via the wired/wireless communication network. In this case, the external terminal may include the first terminal 110, the service providing device 120, the SNS server, and the like.

Further, the second communication unit 131 accesses the SNS server corresponding to the first terminal 110 by the control of the second control unit 134.

The second storage unit 132 stores a user interface (UI), a graphic user interface (GUI), and the like therein.

Further, the second storage unit 132 stores data and programs required to operate the second terminal 130.

The second display unit 133 may display contents such as menu screens by using the UI and/or GUI stored in the second storage unit 132 by the control of the second control unit 134. Herein, the contents displayed on the second display unit 133 may include menu screens including texts or image data (including various information data) and data such as icons, a list menu, a combo box, and the like. Further, the second display unit 133 may be a touch screen.

Further, the second display unit 133 displays access address information linked to an SNS account of the first terminal 110 provided by the SNS server corresponding to the accessed first terminal 110 by the control of the second control unit 134.

The second control unit 134 executes an overall control function for the second terminal 130.

Further, the second terminal 134 accesses the SNS server corresponding to the first terminal 110 through the second communication unit 131.

Further, the second control unit 134 displays access address information provided by the SNS account of the first terminal 110 for the corresponding SNS server on the second display unit 133.

Further, if the access address information displayed on the second display unit 133 is selected (or clicked), the second control unit 134 accesses the service providing device 120 corresponding to the access address information.

Further, the second control unit 134 receives a content corresponding to the access address information transmitted from the service providing device 120 through the second communication unit 131, and stores the received content in the second storage unit 132 or displays the received content through the second display unit 133.

In this case, only if the specific app provided by the service providing device 120 is pre-installed in the second terminal 130, the content may be provided from the service providing device 120, or regardless of whether or not the specific app is installed, the content may be provided from the service providing device 120, or if the specific app is not installed as a result of checking, the specific app is provided from the service providing device 120 and the installed in the second terminal 130 and then, the content may be provided from the service providing device 120. Further, if the second terminal 130 is a fixed terminal installed at a fixed location, the content may be provided from the service providing device 120 regardless of whether or not the specific app is installed.

Further, the second control unit 134 displays the content provided from the service providing device 120 on the second display unit 133 through the web browser regardless of whether or not the specific app is installed. Further, if the specific app is installed in the second terminal 130, the second control unit 134 displays the content provided from the service providing device 120 on the second display unit 133 through the specific app.

As described above, instead of directly sharing a content including personal information displayed in a specific app, such as an electronic wallet app, installed in the terminal with an SNS or the like, the same content, which does not include personal information and is previously stored in the service providing device so as to correspond to the content, may be shared through an SNS corresponding to the terminal.

Further, as described above, a specific content and a content including personal information in addition to the specific content are separately managed and the specific content and the content including personal information may be provided for each use.

Hereinafter, a control method of the electronic wallet system according to the present invention will be described in detail with reference to FIGS. 1 to 6.

Figure 6:
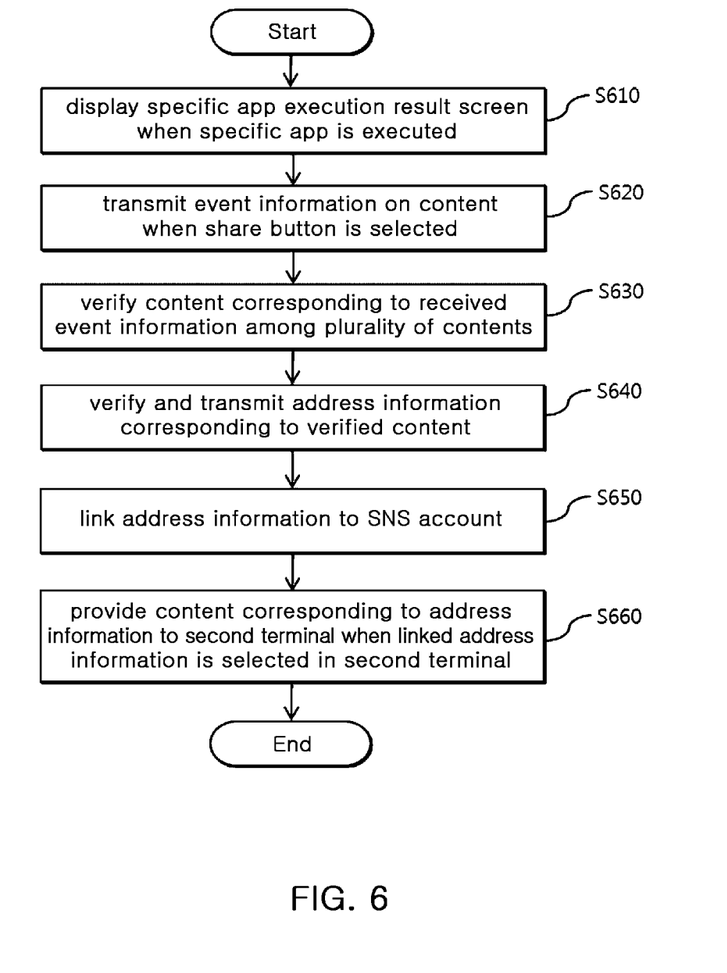
FIG. 6 is a signal flowchart illustrating a communication process of an electronic wallet system according to an embodiment of the present invention.

FIG. 6 is a signal flowchart illustrating a communication process of an electronic wallet system according to an embodiment of the present invention.

First, when a specific app such as an electronic wallet app installed in the first terminal 110 is executed, the first terminal 110 displays the execution result screen on the first display unit 113 and communicates with the service providing device 120 via the wired/wireless communication network in a background state. In this case, execution result screen displayed on the first display unit 113 of the first terminal 110 includes a content including payment-related card information, coupon-related information, and gift card-related information corresponding to the specific app, and identification data for identifying the content, and the content may include unique identification information on the first terminal 110. Herein, the identification information on the first terminal 110 includes an MDN, a mobile IP, a mobile MAC, a Sim card unique information, and serial number of the first terminal 110.

As an example, when a specific app such as an electronic wallet app pre-installed in the first terminal 110 is executed, the first terminal 110 displays an execution result screen. Herein, the specific app execution result screen includes a my-wallet menu, an add menu, an event/news menu, a more-view menu, and the like. In this case, a corresponding menu includes a content including payment-related card information, coupon-related information, gift card-related information, and identification data for identifying the content, and the content includes identification information on the first terminal 110 (S610).

Then, if a predetermined share button displayed on a partial region of the content included in the execution result screen displayed on the first terminal 110 is selected, the first terminal 110 transmits, to the service providing device 120, identification data for identifying the content corresponding to the selected share button.

As an example, when a share button displayed on a partial region of the content including coupon information displayed on the first terminal 110 is selected, the first terminal 110 transmits, to the service providing device 120, identification data (for example, identification number=no7) on the coupon information corresponding to the selected share button (S620).

Then, the service providing device 120 receives identification data for identifying a content transmitted from the first terminal 110.

Further, the service providing device 120 verifies a content corresponding to the received identification data among the plurality of previously stored contents (each including unique identification data). Herein, the content verified by the service providing device 120 includes the same content as the content displayed on the first terminal 110. Although the content displayed on the first terminal 110 includes identification information on the first terminal 110, the content verified by the service providing device 120 (or the plurality of contents previously stored in the service providing device 120) does not include identification information on a terminal (for example, identification information on the first terminal 110).

As an example, the service providing device 120 verifies a content corresponding to the identification data (for example, identification number=no7) transmitted from the first terminal 110 among the plurality of previously stored contents and unique identification data respectively corresponding to the contents (S630).

Then, the service providing device 120 verifies access address information for accessing the verified content (or access address information at which the verified content is stored/access address information of the service providing device 120 in which the verified content is stored).

Further, the service providing device 120 transmits, to the first terminal 110, the verified access address information for accessing the corresponding content.

As an example, the service providing device 120 verifies access address information (including, for example, URL information) at which the verified content is stored in the service providing device 120, and transmits the verified access address information to the first terminal 110 (S640).

Then, the first terminal receives access address information for accessing a content corresponding to the identification data transmitted from the service providing device 120 in response to the transmitted identification data.

Further, the first terminal 110 accesses a predetermined SNS server (not illustrated) corresponding to the first terminal 110 or accesses the SNS server through an SNS-related menu interworking with the specific app.

Further, the first terminal 110 links (or uploads) the received access address information to a corresponding SNS account.

As an example, the first terminal 110 accesses the SNS server to which the first terminal 110 subscribes through the SNS-related menu interworking with the specific app and links access address information (including, for example, URL information) for accessing the received content to the SNS account of the first terminal 110 (S650).

Then, the access address information linked to the SNS account of the first terminal 110 of the SNS server is selected (or clicked) by the second terminal 130, the second terminal 130 accesses the service providing device 120 corresponding to the access address information.

Further, the second terminal 130 receives a content corresponding to the access address information transmitted from the service providing device 120 and displays the received content.

In this case, when the service providing device 120 transmits the content corresponding to the access address information to the second terminal 130, the service providing device 120 may provide the content to the second terminal 130 by any one of the following three methods.

Firstly, the service providing device 120 transmits the content corresponding to the access address information to the second terminal 130 regardless of whether or not the specific app provided by the service providing device 120 is installed. Then, the second terminal 130 displays the content through the web browser or the like installed in the second terminal 130.

Secondly, the service providing device 120 checks whether or not the specific app provided by the service providing device 120 is installed on the basis of the identification information on the second terminal 130 accessing the service providing device 120, and if the specific app is installed in the second terminal 130, the service providing device 120 transmits the content corresponding to the access address information to the second terminal 130 and the second terminal 130 displays the content through the specific app. Further, if the specific app is not installed in the second terminal 130, the service providing device 120 induces the second terminal 130 to install the specific app and then, after the specific app is installed in the second terminal 130, the service providing device 120 transmits the content corresponding to the access address information to the second terminal 130, and the second terminal 130 displays the content after the specific app is installed.

Thirdly, the service providing device 120 may check a kind of the second terminal 130 accessing the service providing device 120. That is, the service providing device 120 checks whether the second terminal 130 is a fixed terminal or a mobile terminal. Further, if the second terminal 130 is a fixed terminal, the service providing device 120 transmits the content corresponding to the access address information to the second terminal 130 regardless of whether or not the specific app is installed. Then, the second terminal 130 displays the content through the web browser or the like installed in the second terminal 130. Further, if the second terminal 130 is a mobile terminal, the service providing device 120 checks whether or not the specific app provided by the service providing device 120 is installed on the basis of the identification information on the second terminal 130 accessing the service providing device 120. If the specific app is not installed in the second terminal 130, the service providing device 120 induces the second terminal 130 to install the specific app and then, after the specific app is installed in the second terminal 130, the service providing device 120 transmits the content corresponding to the access address information to the second terminal 130, and the second terminal 130 displays the content after the specific app is installed.

The control method of the terminal and the service providing device according to the embodiment of the present invention may be prepared with a computer program, and codes and code segments configuring the computer program may be easily deduced by a computer programmer in the art. Further, the corresponding computer program is stored in non-transitory computer readable storage media, and read and executed by the computer or the terminal and the service providing device according to the embodiment of the present invention to implement the control method of the terminal and the service providing device.

The non-transitory computer readable storage media include a magnetic storage medium and an optical storage medium. The computer program implementing the control method of the terminal and the service providing device according to the embodiment of the present invention may be stored and installed in an embedded memory of the terminal, the service providing device, and the like. Alternatively, an external memory such as a smart card storing and installing the computer program implementing the control method of the terminal and the service providing device according to the embodiment of the present invention may be installed on the terminal, the service providing device, and the like through an interface.

In the embodiment of the present invention, as described above, instead of directly sharing a content including personal information displayed in a specific app, such as an electronic wallet app, installed in the terminal with an SNS or the like, the same content, which does not include personal information and is previously stored in the service providing device so as to correspond to the content, is shared through an SNS corresponding to the terminal, so that it is possible to improve convenience of a user and enhance availability of contents.

Further, in the embodiment of the present invention, as described above, a specific content and a content including personal information in addition to the specific content are separately managed and the specific content and the content including personal information are provided for each use, so that it is possible to protect personal information and improve content management efficiency.

Hereinabove, although the present invention is described by specific matters such as concrete components, and the like, embodiments, and drawings, they are provided only for assisting in the entire understanding of the present invention. Therefore, the present invention is not limited to the embodiments. Various modifications and changes may be made by those skilled in the art to which the present invention pertains from this description. Therefore, the spirit of the present invention should not be limited to the above-described embodiments and the following claims as well as all modified equally or equivalently to the claims are intended to fall within the scope and spirit of the invention.

INDUSTRIAL APPLICABILITY

According to the present invention, instead of directly sharing a content including personal information displayed in a specific app, such as an electronic wallet app, installed in the terminal with an SNS or the like, the same content, which does not include personal information and is previously stored in the service providing device so as to correspond to the content, is shared through an SNS corresponding to the terminal, so that it is possible to improve convenience of a user and enhance availability of contents, and as a result, the present invention may be widely used in an electronic commerce field, a marketing field, a financial field, and the like.

What is claimed is:

1. A control method of a service providing device comprising:
   when a predetermined share button is selected in a first terminal, receiving, by a communication unit, identification data configured to identify a first content corresponding to the predetermined share button from the first terminal, wherein the first terminal is configured to, in a background state, transmit to the service providing device, unique identification information of the first terminal including a mobile directory number (MDN), a mobile internet protocol (IP), a mobile media access control (MAC), SIM card information, and a serial number;
   verifying, by a control unit, a first content corresponding to the identification data among a plurality of pre-stored contents;
   transmitting, by the communication unit, access address information to the first terminal, wherein the first content verified by the control unit is stored in the access address information; and
   when a second terminal accesses the service providing device by selecting the access address information, transmitting, by the communication unit, a first content corresponding to the access address information to the second terminal, wherein the access address information is configured to link to a social network service account interworking with the first terminal after the first terminal links the access address information to the social network service account,
   wherein a second content corresponding to the identification data is stored in the first terminal,
   wherein the second content stored in the first terminal includes a first content stored in the service providing device and identification information corresponding to the first terminal,
   wherein the identification information corresponding to the first terminal includes personal information of a user of the first terminal,
   wherein the first content stored in the service providing device does not include the personal information of the user of the first terminal, and
   wherein the second content stored in the first terminal includes the personal information of the user of the first terminal.

2. The method of claim 1, wherein transmitting the first content to the second terminal comprises:
   determining whether a specific app provided by the service providing device is installed in the second terminal based on identification information corresponding to the second terminal; and
   when it is determined that the specific app is installed in the second terminal, transmitting, by the communication unit, the first content corresponding to the access address information to the second terminal.

3. The method of claim 2, wherein transmitting the first content to the second terminal comprises:
   when it is determined that the specific app is not installed in the second terminal, installing the specific app in the second terminal by interworking with the second terminal; and
   transmitting, by the communication unit, the first content corresponding to the access address information to the second terminal.

4. The method of claim 1, wherein transmitting the first content to the second terminal comprises:
   determining a type of the second terminal accessing the service providing device; and
   when it is determined that the second terminal is a fixed terminal, transmitting, by the communication unit, the first content corresponding to the access address information to the second terminal.

5. The method of claim 4, wherein transmitting the first content to the second terminal comprises:
   when it is determined that the second terminal is a mobile terminal, transmitting, by the communication unit, the first content corresponding to the access address information to the second terminal depending on whether the specific app is installed in the second terminal.

6. A non-transitory computer readable storage medium storing a computer program comprising a set of instructions, when executed, arranged to cause a service providing device to:

receive identification data configured to identify a first content corresponding to a predetermined share button from a first terminal when the predetermined share button is selected in the first terminal, wherein the first terminal is configured to, in a background state, transmit to the service providing device, unique identification information of the first terminal including a mobile directory number (MDN), a mobile internet protocol (IP), a mobile media access control (MAC), SIM card information, and a serial number;

verify a first content corresponding to the identification data among a plurality of pre-stored contents;

transmit access address information to the first terminal, wherein the verified first content is stored in the access address information; and transmit a first content corresponding to the access address information to a second terminal when the second terminal accesses the service providing device by selecting the access address information, wherein the access address information is configured to link to a social network service account interworking with the first terminal after the first terminal links the access address to the social network service account, wherein a second content corresponding to the identification data is stored in the first terminal, wherein the second content stored in the first terminal includes a first content stored in the service providing device and identification information corresponding to the first terminal, wherein the identification information corresponding to the first terminal includes personal information on a user of the first terminal, wherein the first content stored in the service providing device does not include the personal information of the user of the first terminal, and wherein the second content stored in the first terminal includes the personal information of the user of the first terminal.

* * * * *